3,138,634
PREPARATION OF CYANOBUTADIENE AND DICYANOBUTENE FROM DIHALOBUTENES

William R. Rolingson, Texas City, Tex., assignor to Monsanto Company, a corporation of Delaware
No Drawing. Filed Aug. 21, 1961, Ser. No. 132,581
5 Claims. (Cl. 260—465.8)

The present invention relates to a process for the production of unsaturated nitriles and, more particularly, to a new method for the preparation of 1-cyanobutadiene-1,3 and 1,4-dicyanobutene-2 from dihalobutenes.

A number of processes have been proposed for preparing 1-cyanobutadiene-1,3 which reacts with itself to form rubber-like polymers and which is of value as an intermediate in the production of plastic materials, wetting agents, and other useful products. However, when made by the prior art methods, either yields of cyanobutadiene are low or the product is contaminated with deleterious by-products difficult to remove. Likewise, methods are known for producing dicyanobutene but the known methods are all liquid-phase operations with their obvious attendant disadvantages.

It is an object of the present invention, therefore, to provide an improved vapor-phase process for the preparation of both cyanobutadiene and dicyanobutene. It is a further object of the invention to provide a process for the production of these nitriles from readily available materials which is relatively simple and efficient. Other objects and advantages of the invention will become apparent from the following description thereof.

According to the invention, the unsaturated nitriles, 1-cyanobutadiene-1,3 and 1,4-dicyanobutene-2, are prepared by reacting a dihalobutene in the vapor phase with hydrogen cyanide at temperatures from about 150° to about 400° C. over a copper-containing catalyst supported upon a material having high surface activity.

The following example is presented to illustrate the invention but is not to be construed as limiting it in any manner whatsoever.

Example

The reactor employed was a Pyrex glass tube 24 inches long and ¾ inch in diameter fitted with means for supporting a catalyst bed about six inches from the bottom of the tube. The central 12 inches of the tube was wrapped with Nichrome wire for heating and was insulated. A thermowell containing a thermocouple for recording temperatures extended through the central portion of the tube. The reactor was packed with sufficient catalyst to fill the heated section and was heated to reaction temperature while a stream of dry nitrogen was passed through it. When the temperature became stabilized at the desired level, the feed mixture was passed through the catalyst bed over a reaction period of about one hour. The hydrogen cyanide was fed from a bomb immersed in hot water through a rotameter into the top of the reactor. The liquid dihalobutene was vaporized by passing it through a rotameter into a tube packed with glass beads and heated to a temperature of about 200° C. The vapors were then introduced into the reactor where they were mixed in the upper section with the hydrogen cyanide before passing through the catalyst bed.

The effluent gas was conducted through a trap maintained at room temperature connected directly under the reactor and then successively through an ice water condenser and a trap immersed in Dry Ice. The total reaction product was analyzed by a combination of fractional distillation and gas chromatographic means with the end products being positively identified by means of their infrared spectra.

A series of runs was made using the foregoing procedure in which 1,4-dichlorobutene-2 was reacted with hydrogen cyanide over cuprous chloride supported on alumina and cuprous chloride supported on silicon carbide (SiC) as catalysts and varying conditions of temperature and reactant ratios. Pressure was essentially atmospheric. Results of these tabulated below demonstrate that this vapor-phase reaction yields either the cyanobutadiene, the dicyanobutene or both compounds depending upon the conditions employed.

| Run No. | Temp., °C. | Catalyst Support | Mole Ratio, HCN:DCB[1] | Once-through Yields (based on DCB[1]) | |
|---|---|---|---|---|---|
| | | | | 1-Cyanobutadiene-1,3 (percent) | 1,4-Dicyanobutene-2 (percent) |
| 32A | 150 | Alumina | 6:1 |  | Trace |
| 32B | 200 | ...do... | 6:1 |  | 16 |
| 46 | 275 | SiC | 9:1 | None | 3.9 |
| 47 | 350 | SiC | 6:1 | Trace | 3.9 |
| 48 | 350 | SiC | 8:1 | 6.3 | 2.5 |
| 78 | 200 | Alumina | 8:1 | 15.0 | 13.0 |
| 85 | 200 | ...do... | 3:1 | 16.5 | 3.1 |
| 86 | 300 | ...do... | 6:1 | 7.2 | None |
| 87 | 200 | ...do... | 7:1 | 15.5 | 8.5 |

[1] Dichlorobutene.

It will be seen from the data above that the suitable reaction temperature varies somewhat with the support employed for the catalyst. Generally, temperatures from about 150° to about 400° C. can be employed. Preferred temperatures lie in the range from about 175° to 300° C. when alumina is the catalyst support and optimum yields of the unsaturated nitriles in this instance are attained at a temperature around 200° C. Slightly higher temperatures are preferred when silicon carbide is used as a catalyst support with those in the range from about 250° to 400° C. being preferred.

While stoichiometric proportions of one mole of hydrogen cyanide per mole of dihalobutene can be employed in the reaction, an excess of hydrogen cyanide is usually used to suppress the formation of chlorobutadiene which is a by-product in the reaction. Ratios of hydrogen cyanide to dihalobutene of 1:1 to 20:1 can be employed but the preferred ratios are those within the range from about 3:1 to about 8:1. At these ratios, the yield of unsaturated nitriles is maximized.

Any copper-containing compound capable of releasing the cuprous ion under the reaction conditions can be employed as a catalyst. In addition to cuprous chloride, there may be employed cuprous cyanide, cuprous bromide, and the like. Cupric salts such as cupric chloride, copper sulphate, and the like may be used since they are reduced to cuprous salts during the reaction. The copper compounds are deposited upon a support which is preferably a material of high surface activity. In addition to the alumina and silicon carbide exemplified, materials such as pumice, kaolin, fuller's earth, activated carbon, silica gel, kieselguhr, and the like are suitable support materials. The catalysts are readily prepared by saturating the support with a solution, alcoholic or otherwise, of the copper-containing compound, boiling the resulting slurry, filtering, and drying the impregnated support. When insoluble cuprous salts are employed, solution is effected by adding sufficient HCl to the solvent to facilitate dissolution.

The process of the invention is not limited to the 1,4-dichlorobutene-2 of the example. Equally useful as feed material is the 3,4-dichlorobutene-1 or mixtures of these two dichlorobutenes. Regardless of which of these materials is used, the final product contains the 1,4-dicyanobutene-2 and/or 1-cyanobutadiene-1,3. Likewise, analogous dibromobutenes or mixtures thereof may be substituted for the dichlorobutenes.

What is claimed is:

1. A method for the preparation of an organic unsaturated nitrile chosen from the group consisting of 1-cyanobutadiene-1,3 and 1,4-dicyanobutene-2 which consists of reacting hydrogen cyanide and a dihalobutene chosen from the group consisting of 1,4-dichloro-2-butene, 1,4-dibromo-2-butene, 3,4-dichloro-1-butene, and 3,4-dibromo-1-butene and mixtures thereof in the vapor phase over a catalyst consisting essentially of a copper salt chosen from the group consisting of copper chloride, copper bromide, copper cyanide, and copper sulfate supported on a material of high surface activity chosen from the group consisting of silicon carbide, alumina, pumice, kaolin, fuller's earth, activated carbon, silica gel, and kieselguhr at a temperature in the range from about 150° to about 400° C., the ratio of hydrogen cyanide to dihalobutene being maintained within the range from about 3:1 to about 8:1.

2. A method for the preparation of an organic unsaturated nitrile chosen from the group consisting of 1-cyanobutadiene-1,3 and 1,4-dicyanobutene-2 which consists of reacting hydrogen cyanide and a dihalobutene chosen from the group consisting of 1,4-dichloro-2-butene, 1,4-dibromo-2-butene, 3,4-dichloro-1-butene, and 3,4-dibromo-1-butene and mixtures thereof in the vapor phase at temperatures in the range from about 175° to about 300° C. over a catalyst consisting essentially of copper chloride supported on alumina, the ratio of hydrogen cyanide to dihalobutene being mainatined within the range from about 3:1 to about 8:1.

3. A method for the preparation of an organic unsaturated nitrile chosen from the group consisting of 1-cyanobutadiene-1,3 and 1,4-dicyanobutene-2 which consists of reacting hydrogen cyanide and a dihalobutene chosen from the group consisting of 1,4-dichloro-2-butene, 1,4-dibromo-2-butene, 3,4-dichloro-1-butene, and 3,4-dibromo-1-butene and mixtures thereof in the vapor phase at temperatures in the range from about 250° to about 400° C. over a catalyst consisting essentially of copper chloride supported on silicon carbide, the ratio of hydrogen cyanide to dihalobutene being maintained within the range from about 3:1 to about 8:1.

4. The method of preparing an organic unsaturated nitrile chosen from the group consisting of 1-cyanobutadiene-1,3 and 1,4-dicyanobutene-2 which comprises reacting hydrogen cyanide and 1,4-dichlorobutene-2 in a mole ratio of from about 3:1 to about 8:1 in the vapor phase over a catalyst consisting essentially of copper chloride supported on alumina at a temperature of about 200° C.

5. The method of preparing an organic unsaturated nitrile chosen from the group consisting of 1-cyanobutadiene-1,3 and 1,4-dicyanobutene-2 which comprises reacting hydrogen cyanide and 1,4-dichlorobutene-2 in a mole ratio from about 3:1 to about 8:1 in the vapor phase over a catalyst consisting essentially of copper chloride supported on silicon carbide at a temperature of about 350° C.

References Cited in the file of this patent
UNITED STATES PATENTS

| | | |
|---|---|---|
| 2,477,573 | Borcherdt | Aug. 2, 1949 |
| 2,478,258 | Farlow | Aug. 9, 1949 |